United States Patent
Takeda et al.

(10) Patent No.: US 12,147,048 B2
(45) Date of Patent: Nov. 19, 2024

(54) VIRTUAL IMAGE DISPLAY DEVICE

(71) Applicant: SEIKO EPSON CORPORATION, Tokyo (JP)

(72) Inventors: Takashi Takeda, Suwa (JP); Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/494,758

(22) Filed: Oct. 25, 2023

(65) Prior Publication Data

US 2024/0142780 A1 May 2, 2024

(30) Foreign Application Priority Data

Oct. 28, 2022 (JP) ................. 2022-173085

(51) Int. Cl.
| | | |
|---|---|---|
| *G02B 27/01* | (2006.01) | |
| *G02B 27/09* | (2006.01) | |
| *G02B 27/28* | (2006.01) | |
| *G02F 1/29* | (2006.01) | |

(52) U.S. Cl.
CPC ..... *G02B 27/0172* (2013.01); *G02B 27/0179* (2013.01); *G02B 27/0955* (2013.01); *G02B 27/283* (2013.01); *G02F 1/294* (2021.01); *G02B 2027/0185* (2013.01)

(58) Field of Classification Search
CPC .............. G02B 27/017; G02B 27/0172; G02B 27/0179; G02B 27/0955; G02B 27/283; G02B 2027/0185; G02F 1/294
See application file for complete search history.

(56) References Cited

U.S. PATENT DOCUMENTS

| | | | |
|---|---|---|---|
| 2018/0288359 A1* | 10/2018 | Komatsu | G02B 27/0955 |
| 2020/0348528 A1* | 11/2020 | Jamali | G02B 27/28 |
| 2021/0003848 A1* | 1/2021 | Choi | G02B 27/0172 |

FOREIGN PATENT DOCUMENTS

JP 2018169428 11/2018

* cited by examiner

*Primary Examiner* — Nitin Patel
*Assistant Examiner* — Cory A Almeida
(74) *Attorney, Agent, or Firm* — JCIPRNET

(57) ABSTRACT

A virtual image display device includes a first image display device configured to display a virtual image, a second image display device configured to display a virtual image, a line-of-sight direction distance detection device configured to detect an object distance in a line-of-sight direction of a wearer, an image display control unit configured to control display states of the first image display device and the second image display device in accordance with the object distance, and a liquid crystal lens configured to be disposed in front of eyes of the wearer and configured such that a focal length changes with respect to a s-polarization component of image light emitted from the first image display device and the second image display device.

7 Claims, 14 Drawing Sheets

VIRTUAL IMAGE DISPLAY DEVICE

The present application is based on, and claims priority from JP Application Serial Number 2022-173085, filed Oct. 28, 2022, the disclosure of which is hereby incorporated by reference herein in its entirety.

BACKGROUND

1. Technical Field

The present disclosure relates to a virtual image display device that makes it possible to observe a virtual image, and more particularly to a virtual image display device that controls a display state in accordance with an object distance.

2. Related Art

There is known a virtual image display device including an image display unit that makes outside light visible, a line-of-sight direction distance detection unit that detects a line-of-sight direction of a user and a distance to an object in the line-of-sight direction, and a display control unit that controls a display operation of the image display unit, in which the image display unit includes a focus convergence changing unit that changes the convergence and focus of a projected display image, and the display control unit controls the focus convergence changing unit based on the line-of-sight direction and the distance to the object which are detected by the line-of-sight direction distance detection unit (JP-A-2018-169428). In this device, an image in substantially the same convergence and focus state as an object is displayed with respect to the object in the outside world which is visually recognized by an observer.

In the above-described device, the focus convergence changing unit requires movable parts such as a pair of lenses relatively displaced and a liquid lens of which an optical surface shape changes, and it is not easy to improve responsiveness and reduce the size of a mechanism. Since the focus convergence changing unit is incorporated in a projection unit in which a light beam flux is relatively thin, a decrease in surface accuracy is likely to occur.

SUMMARY

A virtual image display device according to one aspect of the present disclosure includes a first image display device configured to display a virtual image, a second image display device configured to display a virtual image, a line-of-sight direction distance detection device configured to detect an object distance in a line-of-sight direction of a wearer, an image display control unit configured to control display states of the first image display device and the second image display device in accordance with the object distance, and a liquid crystal lens configured to be disposed in front of eyes of the wearer and configured having a focal length changing with respect to a polarization component of image light emitted from the first image display device and the second image display device.

BRIEF DESCRIPTION OF THE DRAWINGS

FIG. 2 is a plan view illustrating an eyeball measuring device and the like.

FIG. 7 is a block diagram illustrating a circuit system including a control circuit and the like.

DESCRIPTION OF EMBODIMENTS

First Embodiment

Next, a virtual image display device according to a first embodiment of the present disclosure will be described with reference to FIGS. 1 and 2.

Figure 1:
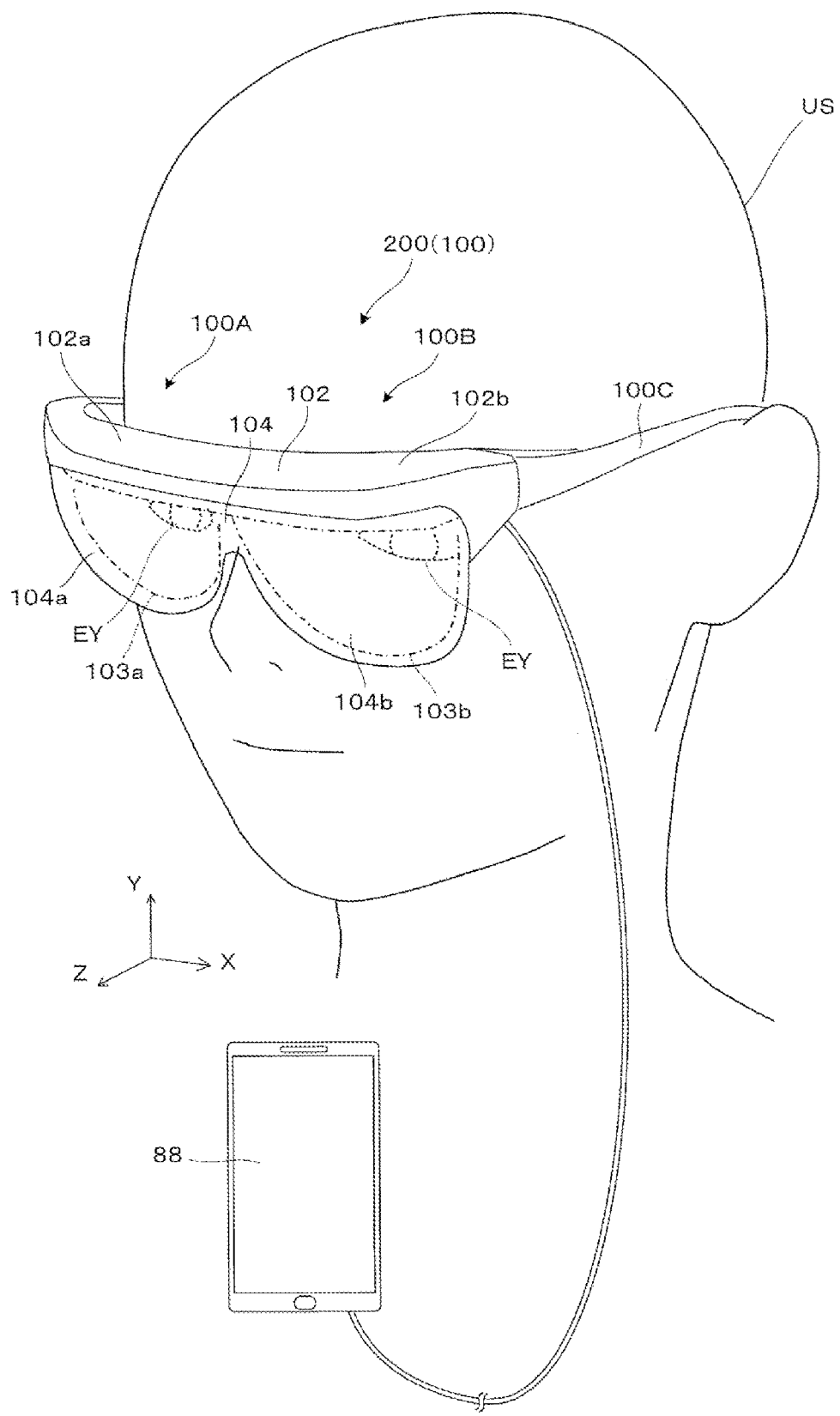
FIG. 1 is an external perspective view illustrating a mounted state of a virtual image display device according to a first embodiment.

FIG. 1 is a perspective view illustrating a mounted state of a head-mounted display (hereinafter also referred to as HMD) 200. The HMD 200 allows an observer or a wearer US who wears the HMD 200 to recognize a video as a virtual image. In FIG. 1 and the like, X, Y, and Z indicate an orthogonal coordinate system, a +X direction corresponds to a lateral direction in which both eyes EY of the observer or wearer US wearing the HMD 200 or a virtual image display device 100 are aligned, a +Y direction corresponds to an upward direction orthogonal to the lateral direction in which both the eyes EY are aligned for the wearer US, and a +Z direction corresponds to a forward or front direction for the wearer US. The ±Y directions are parallel to the vertical axis or the vertical direction.

The HMD 200 includes a first display device 100A for a right eye, a second display device 100B for a left eye, a pair of temple-shaped support devices 100C that support the display devices 100A and 100B, and a user terminal 88 which is an information terminal. The first display device 100A is constituted by a first display driving unit 102a that is disposed in an upper part, a first combiner 103a that is formed in a spectacle lens shape and covers the front of the eyes, and a light transmitting cover 104a that covers the first combiner 103a from the front thereof. Similarly, the second display device 100B is constituted by a second display driving unit 102b that is disposed in an upper part, a second combiner 103b that is formed in a spectacle lens shape and covers the front of the eyes, and a light transmitting cover 104b that covers the second combiner 103b from the front thereof. The support device 100C is a mounting member that is mounted on the head of the wearer US, and supports the upper end sides of the pair of combiners 103a and 103b and the upper end sides of the pair of light transmitting covers 104a and 104b via the display driving units 102a and 102b integrated with each other in appearance. A combination of the pair of display driving units 102a and 102b is referred to as a driving device 102. A combination of the pair of light transmitting covers 104a and 104b is referred to as a shade 104.

Figure 2:
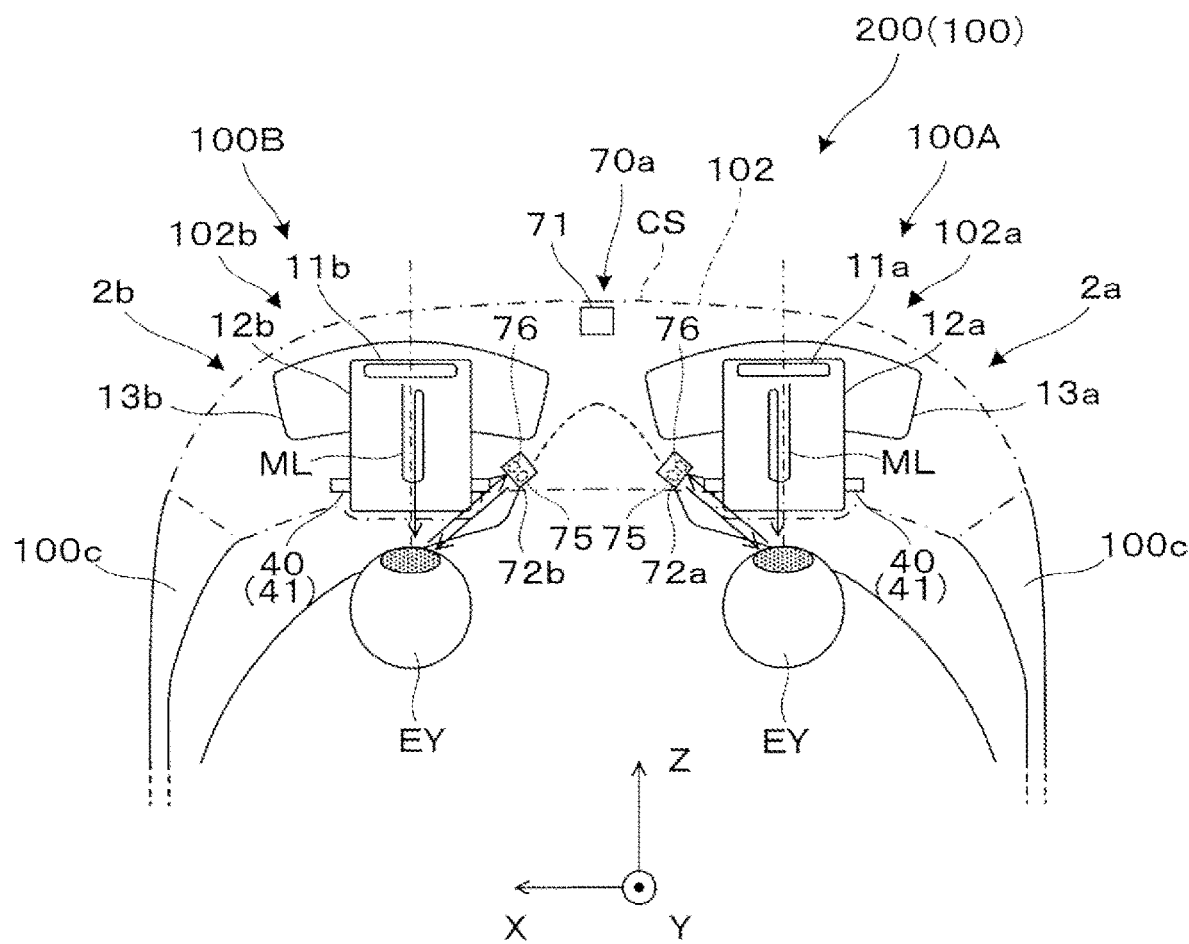

FIG. 2 is a plan view of the HMD 200 and illustrates the inside of a case CS of the driving device 102 in a see-through manner. The first display device 100A includes a first display element 11a disposed in a front portion of the first display driving unit 102a, a first projection optical system 12a disposed behind the first display element 11a, and the combiner 103a disposed below the first projection optical system 12a as a first image display device 2a, and includes a liquid crystal lens 41 disposed behind the combiner 103a as a focal length changing device 40. The first display element 11a forms image light ML, the first projection optical system 12a receives the image light ML from the first display element 11a, and the combiner 103a partially reflects the image light ML emitted from the first projection optical system 12a towards the eye EY. The second display device 100B includes a second display element 11b disposed in a front portion of the second display driving unit 102b, a second projection optical system 12b disposed behind the second display element 11b, and a combiner 103b disposed below the second projection optical system 12b as a second image display device 2b, and includes a liquid crystal lens 41 disposed behind the combiner 103a as a focal length changing device 40. The first display device 100A and the second display device 100B are optically the same or are reversed right and left.

In addition to the projection optical systems 12a and 12b and the like that constitute the display devices 100A and 100B, a distance measurement unit 71 and line-of-sight detection units 72a and 72b are incorporated in the driving device 102. Here, the distance measurement unit 71 and the line-of-sight detection units 72a and 72b function as a line-of-sight direction distance detection device 70a that detects a line-of-sight direction of a user and a distance to an object in the line-of-sight direction.

The distance measurement unit 71 serves as a part of the line-of-sight direction distance detection device 70a to make it possible to measure a distance to each part of an external image observed by the observer. The distance measurement unit 71 can be a mechanism using various distance measurement principles, and a mechanism, such as a flash lidar (flash LiDAR), which detects a phase difference and a delay time at the time of projecting infrared light and detecting the light by an image sensor can be used. A stereo camera that determines a distance from a parallax can also be used.

One line-of-sight detection unit 72a serves as a part of the line-of-sight direction distance detection device 70a and detects the orientation of the right eye EY of the observer, that is, the line-of-sight direction of the right eye. The line-of-sight detection unit 72a includes a light source 75 for infrared or visible light such as an LED, and a camera 76 that captures an image of the eye EY illuminated by the light source 75, and detects the movements of the iris and other parts based on the outer corner of the eye, corneal reflection, and the like. The line-of-sight detection unit 72 may perform calibration in the line-of-sight direction for each observer wearing the HMD 200 or the virtual image display device 100 to improve suitability. The other line-of-sight detection unit 72b detects the orientation of the left eye EY of the observer, that is, the line-of-sight direction of the left eye, and has the same structure as that of the one line-of-sight detection unit 72a.

The line-of-sight direction of the observer can be ascertained by using outputs (for example, average values) of both the line-of-sight detection units 72a and 72b. The distance measurement unit 71 can measure a target distance to an object gazed at by the observer by performing distance measurement on the direction or angle of the line of sight. When the distance measurement unit 71 measures a distance image, it is possible to specify an object gazed at by the observer from a relationship between a distance image obtained by the distance measurement unit 71 and the direction or angle of the line of sight obtained by the line-of-sight detection units 72a and 72b and to measure a distance to an object gazed at (hereinafter also referred to as object distance).

Figure 3:
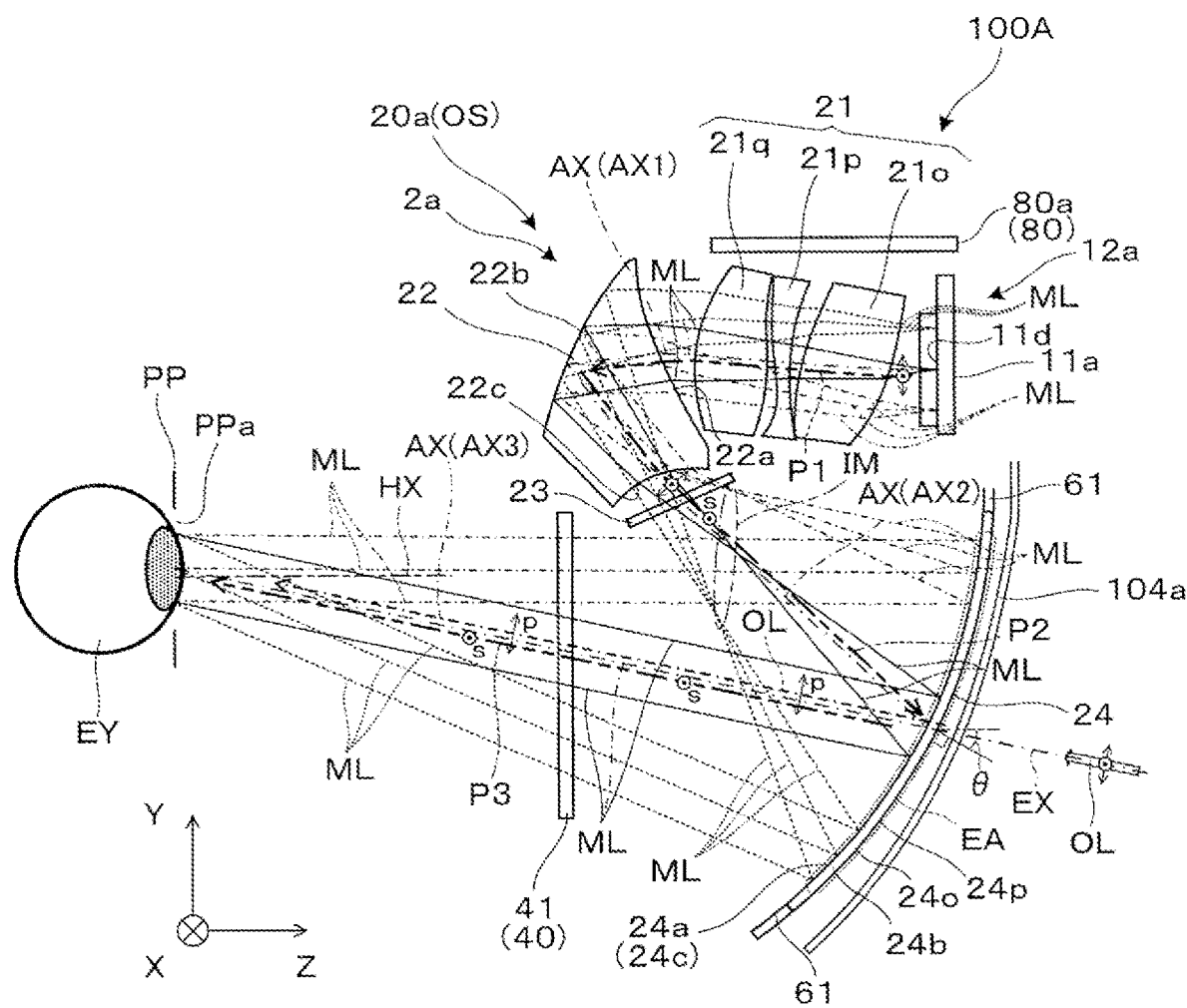
FIG. 3 is a side cross-sectional view illustrating an optical structure of a display unit.

FIG. 3 is a side cross-sectional view illustrating the structure of the first display device 100A. The first display device 100A includes a first display element 11a, a first display unit 20a, and a circuit member 80a. The first display element 11a is an image light generation device and is also referred to as a video element. The first display unit 20a is an imaging optical system that forms a virtual image, and includes a projection lens 21, a prism mirror 22, a polarizing plate 23, a see-through mirror 24, and a liquid crystal lens 41. In the first display unit 20a, the projection lens 21, the prism mirror 22, and the polarizing plate 28 function as the first projection optical system 12a on which image light ML from the first display element 11a is incident, and the see-through mirror 24 is equivalent to the first combiner 103a illustrated in FIG. 1 and the like and partially reflects the image light ML emitted from the first projection optical system 12a toward a pupil position PP or the eyes EY. In the first display unit 20a, the first projection optical system 12a, the polarizing plate 23, the see-through mirror 24, and the liquid crystal lens 41 are integrated with each other in a state where they are aligned state by a frame member (not illustrated).

In the first display device 100A, the first display element 11a is a self-luminous image light generation device. The first display element 11a emits the image light ML to the first projection optical system 12a. The first display element 11a is, for example, an organic electroluminescence (EL) display, and forms a color still image or a moving image on a two-dimensional display surface 11d. The first display element 11a is driven by the circuit member 80a to perform a display operation. The first display element 11a is not limited to the organic EL display, and can be replaced with a display device using an inorganic EL, an organic LED, an LED array, a laser array, a quantum dot light emission element, or the like. The first display element 11a is not limited to a self-luminous image light generation device, and may be a device that forms an image by uniformly illuminating a light modulation element such as a digital micromirror device with a light source.

The first display unit 20a is an off-axis optical system OS, and an optical axis AX is bent by the see-through mirror 24 and the prism mirror 22 within an off-axis plane parallel to the YZ plane, which is a reference plane. On the off-axis plane parallel to the YZ plane and corresponding to the plane of the paper, an optical path portion P1 from the projection lens 21 to a reflection surface 22b, an optical path portion P2 from the reflection surface 22b to the see-through mirror 24, and an optical path portion P3 from the see-through mirror 24 to the pupil position PP are folded in a Z shape in two stages. Correspondingly, an optical axis portion AX1 from the projection lens 21 to the reflection surface 22b, an optical axis portion AX2 from the reflection surface 22b to the see-through mirror 24, and an optical axis portion AX3 from the see-through mirror 24 to the pupil position PP are disposed to be folded in a Z shape in two stages. In the see-through mirror 24, a normal line at a central position intersecting with the optical axis AX forms an angle θ of approximately 40 degrees to 50 degrees with respect to the Z direction. In the first display unit 20a, the optical elements 21, 22, 23, and 24 constituting the first display device 100A are arrayed so that height positions thereof are changed in a longitudinal direction, and an increase in a lateral width of the first display device 100A can be prevented. Further, since the optical path portions P1 to P3 or the optical axis portions AX1 to AX3 are disposed to be folded in a Z shape in the two stages by folding of the optical path due to reflection by the prism mirror 22 and the like, and the optical path portions P1 and P3 or the optical axis portions AX1 and AX3 are relatively close to horizontal, it is possible to reduce the size of the first display unit 20a both in an up-down direction and a front-back direction.

In the first display unit 20a, the optical path portion P1 from the projection lens 21 to the reflection surface 22b extends in a slightly obliquely upward direction or a direction nearly parallel to the Z direction toward a back side with respect to a viewpoint. The optical path portion P2 from the reflection surface 22b to the see-through mirror 24 extends obliquely downward toward a front side. The optical path portion P3 from the see-through mirror 24 to the pupil position PP extends slightly obliquely upward or in a direction nearly parallel to the Z direction toward the back side. An emission optical axis EX, which is an extension of the optical axis portion AX3 corresponding to the optical path portion P3 toward the outside world, extends downwardly by approximately 10 degrees with respect to a central axis HX parallel to the forward +Z direction. This is because a line of sight of a human being is stable in a slightly lowered eye state in which the line of sight is inclined downward by approximately 10 degrees with respect to a horizontal direction. The central axis HX that extends in the horizontal direction with respect to the pupil position PP assumes a case in which the wearer US wearing the first display device 100A relaxes in an upright posture and faces the front and gazes at the horizontal direction or the horizontal line.

In the first display unit 20a, the projection lens 21 includes a first lens 21o, a second lens 21p, and a third lens 21q. The projection lens 21 receives the image light ML emitted from the first display element 11a and causes the image light ML to be incident on the prism mirror 22. The projection lens 21 focuses the image light ML emitted from the first display element 11a into a state close to a parallel luminous flux. The incident surface and the emitting surface of each of the lenses 21o, 21p, and 21q constituting the projection lens 21 are free-form surfaces or aspherical surfaces, and the incident surface and the emitting surface have asymmetry across the optical axis AX with respect to the vertical direction parallel to the YZ plane and intersecting the optical axis AX and have symmetry across the optical axis AX with respect to the lateral direction or the X direction. The first lens 21o, the second lens 21p, and the third lens 21q are formed of, for example, a resin, but may also be formed of glass. An antireflection film can be formed at each of the optical surfaces of the first lens 21o, the second lens 21p and the third lens 21q constituting the projection lens 21.

The prism mirror 22 is an optical member having a refractive reflection function which is a mixture of a mirror function and a lens function, and refracts and reflects the image light ML from the projection lens 21. The prism mirror 22 has an incident surface 22a disposed on the projection lens 21 side, a reflection surface 22b that bends the optical axis AX, and an emitting surface 22c that faces the reflection surface 22b and is disposed in a direction symmetrical to the incident surface 22a. The incident surface 22a, the reflection surface 22b, and the emitting surface 22c which are the optical surfaces constituting the prism mirror 22 are asymmetrical to the longitudinal direction parallel to the YZ plane and intersecting the optical axis AX with the optical axis AX interposed therebetween, and are symmetrical to the lateral direction or the X direction with the optical axis AX interposed therebetween. The optical surface of the prism mirror 22, that is, the incident surface 22a, the reflection surface 22b, and the emitting surface 22c are free-form surfaces or aspherical surfaces. The prism mirror 22 may be formed of, for example, a resin, but may also be formed of glass. The reflection surface 22b is not limited to one that reflects the image light ML by total reflection, and may be a reflection surface constituted by a metal film or a dielectric multilayer film. Although detailed illustration is omitted, an antireflection film can be formed above the incident surface 22a and the emitting surface 22c.

The polarizing plate 23 is a transmissive polarizing plate and is disposed to face the emitting surface 22c of the prism mirror 22. The polarizing plate 23 is an optical element in which an s-polarized light transmitting film is formed at one side of a parallel plate substrate, and the polarizing plate 23 transmits an s-polarization component in the image light ML with high transmittance and substantially blocks a p-polarization component by absorption or reflection. The image light ML, which is emitted from the first display element 11a and is incident on the polarizing plate 23 via the prism mirror 22 and the like, includes s-polarized light of which an electric field vibration direction is perpendicular to the YZ plane or the plane of the paper, and p-polarized light of which an electric field vibration direction is parallel to the YZ plane or the plane of the paper. The image light ML that has passed through the polarizing plate 23 becomes polarized light containing only s-polarized light limited in the vibration direction perpendicular to the YZ plane.

The see-through mirror 24, that is, the first combiner 103a, reflects the image light ML emitted from the prism mirror 22 and having passed through the polarizing plate 23 and partially transmits outside light OL. The see-through mirror 24 reflects the image light ML from the prism mirror 22 toward the pupil position PP.

The see-through mirror 24 is a concave mirror that covers the pupil position PP at which the eye EY or the pupil is disposed, has a concave shape toward the pupil position PP, and has a convex shape toward the outside world. The see-through mirror 24 is a magnifying lens or a collimator, and is a principal ray of the image light ML emitted from each point on the display surface 11d. The see-through mirror 24 converges the principal ray of the image light ML, which spreads after being formed as an intermediate image IM in the vicinity of the emission side of the prism mirror 22 of the first projection optical system 12a, on the pupil position PP. The see-through mirror 24 serves as a concave mirror and enables enlarged viewing of the intermediate image IM formed by the first display element 11a, which is an image light generation device, and re-imaged by the first projection optical system 12a. The see-through mirror 24 needs to have a spread equal to or greater than that of an effective area EA corresponding to an angle of view from the viewpoint of being disposed between the intermediate image IM and the pupil position PP.

The see-through mirror 24 is a semi-transmissive mirror plate having a structure in which a transmissive reflection film 24a is formed at the rear surface of a plate-shaped body 24b. The transmissive reflection film 24a of the see-through mirror 24 functions as a reflection surface 24c and reflects s-polarized light and p-polarized light substantially equally. The reflection surface 24c has asymmetry across the optical axis AX in the longitudinal direction that is parallel to the YZ plane and intersects the optical axis AX, and has symmetry across the optical axis AX in the lateral direction or the X direction. The reflection surface 24c of the see-through mirror 24 is a free-form surface or an aspherical surface. The reflection surface 24c extends beyond the effective area EA. When the reflection surface 24c is formed in the outer area wider than the effective area EA, a difference in visibility is less likely to occur between an external image from behind the effective area EA and an external image from behind the outer area.

A polarizing film 24p, which is a p-polarized light transmitting film, is formed at an outer surface 24o of the see-through mirror 24. The polarizing film 24p and the transmissive reflection film 24a of the see-through mirror 24 partially transmit the outside light OL. Thereby, a see-through view of the outside world becomes possible, and a virtual image can be superimposed on the external image. At this time, when the plate-shaped body 24b has a thickness of equal to or less than approximately several millimeters, a change in magnification of the external image can be reduced. A reflectance of the reflection surface 24c with respect to the image light ML and the outside light OL is set to from 10% to 50% in a range of an incident angle of the assumed image light ML (corresponding to the effective area EA) from the viewpoint of ensuring a brightness of the image light ML and facilitating observation of the external image in a see-through manner. The plate-shaped body 24b, which is the base material of the see-through mirror 24, is formed of a resin, for example, but can also be formed of glass. The plate-shaped body 24b is formed of the same material as a support plate 61 that supports the plate-shaped body 24b from the surroundings thereof, and has substantially the same thickness as the support plate 61. The transmissive reflection film 24a is formed of, for example, a dielectric multilayer film constituted by a plurality of dielectric layers having an adjusted film thickness. The transmissive reflection film 24a may be a single-layer film or a multilayer film of a metal such as Al or Ag of which the film thickness has been adjusted. The transmissive reflection film 24a may be formed by lamination using deposition, for example, and may also be formed by attaching a sheet-shaped reflection film. The polarizing film 24p is, for example, a resin sheet obtained by extending PVA with iodine adsorbed thereon in a specific direction. However, the present disclosure is not limited thereto, and the polarizing film 24p may be formed of a dielectric multilayer film.

The light transmitting cover 104a is disposed in front of the see-through mirror 24. The light transmitting cover 104a is a thin plate-shaped member having high light transmittance, and its upper end is supported by the case CS (see FIG. 2). The light transmitting cover 104a has a convex shape toward the outside world and has a uniform thickness. The light transmitting cover 104a does not affect the imaging of the image light ML, and a curvature thereof can be arbitrarily set within a range in which it does not interfere with the see-through mirror 24. The light transmitting cover 104a is as thin as approximately several millimeters or less and hardly affects observation of an external image. The light transmitting cover 104a is formed of, for example, a resin, and an antireflection film or a hard coating layer may be formed thereon.

The liquid crystal lens 41 is a variable power lens and functions with respect to the s-polarization component of the image light ML emitted from the first image display device 2a. That is, the liquid crystal lens 41 exerts a lens function or lens effect on the image light ML, and can change the lens function or lens effect. The liquid crystal lens 41 can change the lens effect by changing a distribution state of birefringence for the s-polarization component of the image light ML. The liquid crystal lens 41 is disposed between the see-through mirror 24 and the pupil position PP. That is, the liquid crystal lens 41 is disposed in front of the eye EY of the wearer US. The liquid crystal lens 41 can increase or decrease power acting on the image light ML, which is s-polarized light, in accordance with a control signal from the outside, but does not act on the outside light OL, which is p-polarized light, and functions as a parallel flat plate. That is, the liquid crystal lens 41 allows the outside light OL that has passed through the combiner 103a to pass therethrough without a lens effect.

The liquid crystal lens 41 is disposed at a position near the eye EY and at a position where a light flux of the image light ML relatively spreads. At such a position where the light flux relatively spreads, it is easy to suppress the disturbance of a wavefront due to the liquid crystal lens 41, and image deterioration can be reduced.

Figure 4:
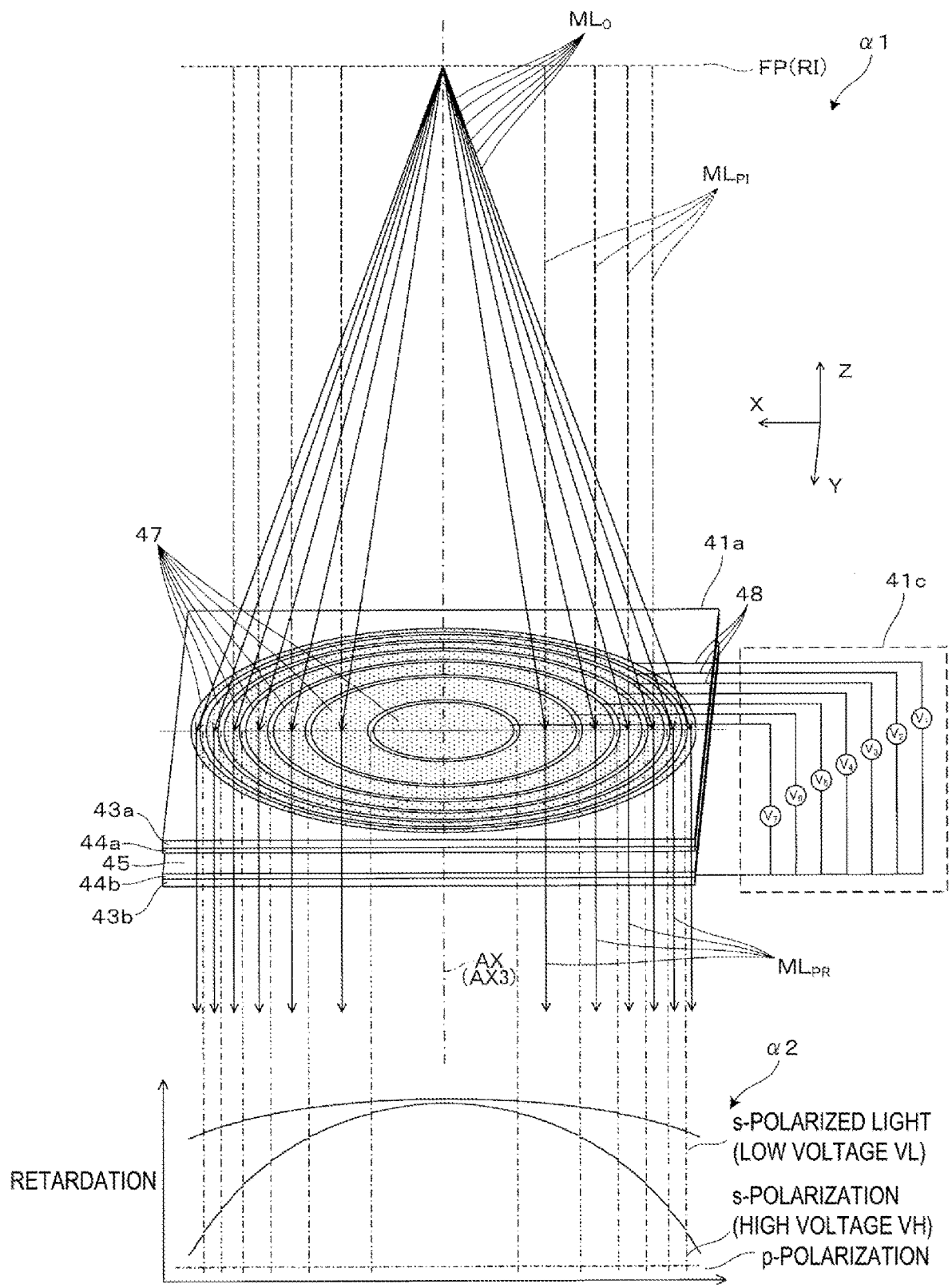
FIG. 4 is a diagram illustrating a structure and a function of a liquid crystal lens.
Figure 5:
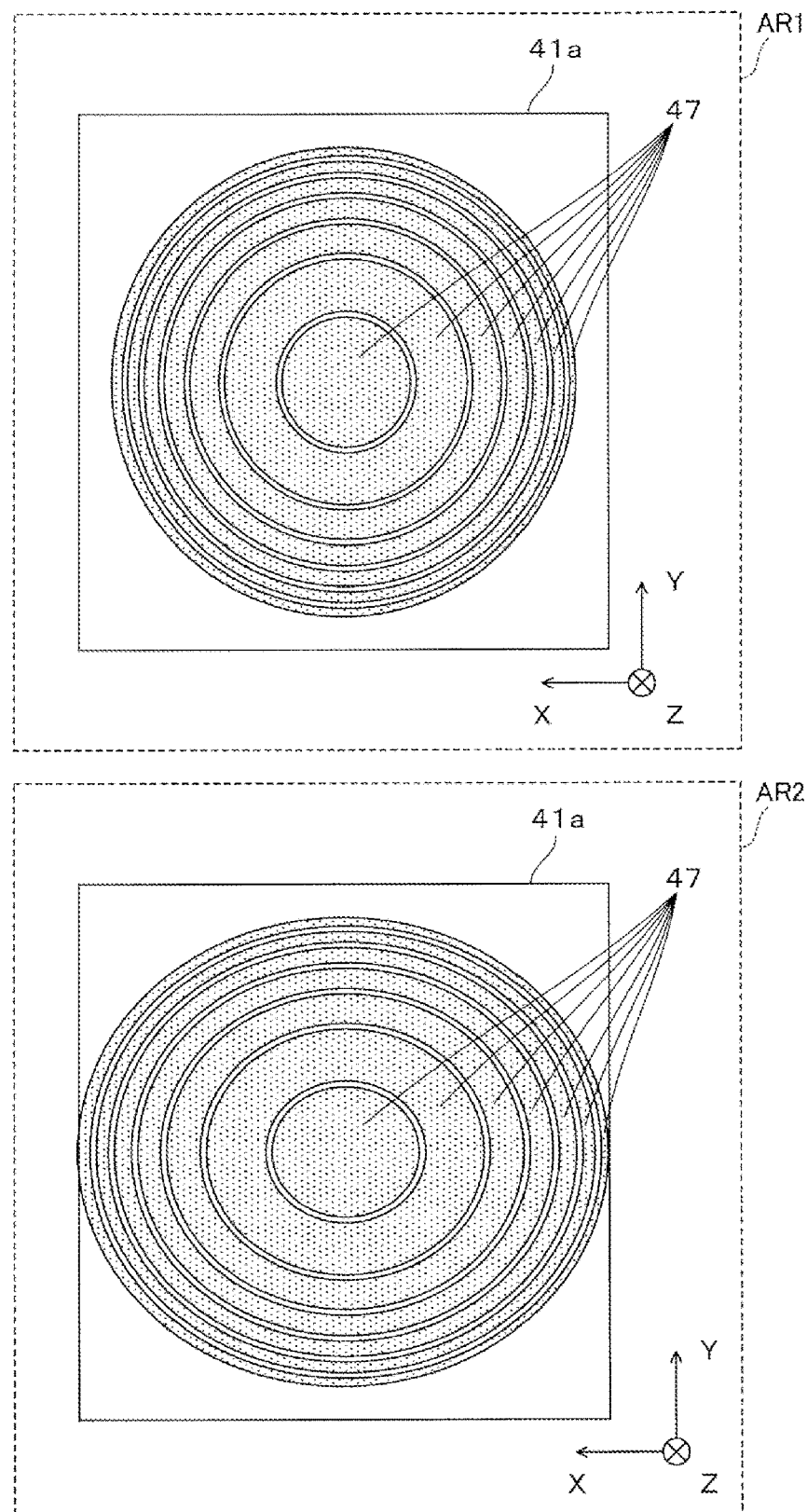
FIG. 5 is a diagram illustrating an electrode pattern formed in the liquid crystal lens and a modification example of the electrode pattern.

FIG. 4 is a diagram illustrating a structure and function of the liquid crystal lens 41. FIG. 5 is a plan view illustrating electrode patterns formed at the liquid crystal lens 41. In FIG. 4, an upper side a1 is a conceptual perspective view of the liquid crystal lens 41, and a lower side α2 is a chart illustrating a distribution state of retardation of the liquid crystal lens 41. In FIG. 5, an area AR1 is a conceptual diagram illustrating the basic electrode pattern applied to the liquid crystal lens 41, and an area AR2 is a conceptual diagram illustrating a modification example of an electrode pattern applied to the liquid crystal lens 41. The liquid crystal lens 41 is a lens that functions as a lens with respect to a polarization component, that is, a lens that has a lens function acting on the polarization component, and can change the lens function, that is, power by external control. The liquid crystal lens 41 includes a lens member 41a and a drive circuit 41c. The lens member 41a includes two light transmitting substrates 43a and 43b facing each other, two electrode layers 44a and 44b provided on the inner surfaces of the light transmitting substrates 43a and 43b, and a liquid crystal layer 45 interposed between the electrode layers 44a and 44b. Although not illustrated in the drawing, alignment films are disposed between the electrode layers 44a and 44b and the liquid crystal layer 45 to adjust an initial alignment state of the liquid crystal layer 45. The first electrode layer 44a includes a large number of electrodes 47 disposed concentrically along the XY plane as a ring portion, and the electrodes 47 are annular transparent electrodes. The large number of electrodes 47 are spaced apart from each other, and the lateral width of the electrode 47 located on the outer side is narrowed. The lateral width of the electrode 47 affects the accuracy of a refraction action of the lens member 41a. The electrodes 47 are coupled to the drive circuit 41c via a wiring 48 insulated by an insulating layer, which is not illustrated in the drawing, on a route in the middle. The second electrode layer 44b is a common electrode extending parallel to the XY plane, and is uniformly formed along the light transmitting substrate 43b. Different application voltages V1 to V7 are applied to the large number of electrodes 47 to change a distribution state of birefringence or retardation. When the liquid crystal lens 41 has an effect of a convex lens, the application voltage V1 is set higher than the application voltage V7, and the application voltages V2 to V6 are set to values gradually changed within a voltage range of V1 to V7. In this case, for s-polarized light, a voltage applied to the electrode 47 disposed on the outermost side, which is a peripheral portion, is increased, retardation is reduced, and a relatively large phase difference is given, so that a wavefront advances. A voltage applied to the electrode 47 disposed on the outermost side, which is a peripheral portion, is lowered, retardation is maintained in a state close to the original state, and a large phase difference is not given, so that a wavefront does not advance. Thus, image light $ML_0$ in a diverging state which is incident on the liquid crystal lens 41 from an image RI set on a predetermined focal plane FP is s-polarized light, and passes through the liquid crystal lens 41 to receive an action as a convex lens and becomes image light $ML_{PR}$ in a substantially collimated state. Virtual image light $ML_{PI}$ that traces back the image light $ML_{PR}$ matches that from an image at infinity. In this case, an external image corresponding to outside light OL can be displayed to be superimposed on an image RI corresponding to the image light $ML_{PI}$. In the above, when a relative ratio of the application voltages V1 to V7 is substantially maintained so that the application voltages are set to be low, a difference in retardation between the center and the periphery decreases, and an absolute value of positive power of the liquid crystal lens 41 decreases. That is, the absolute value of the power can be increased by applying a high voltage VH to the liquid crystal lens 41, the absolute value of the power can be decreased by applying a low voltage VL to the liquid crystal lens 41, and the drive circuit 41c allows the liquid crystal lens 41 to function as an externally adjustable varifocal lens.

Figure 6:
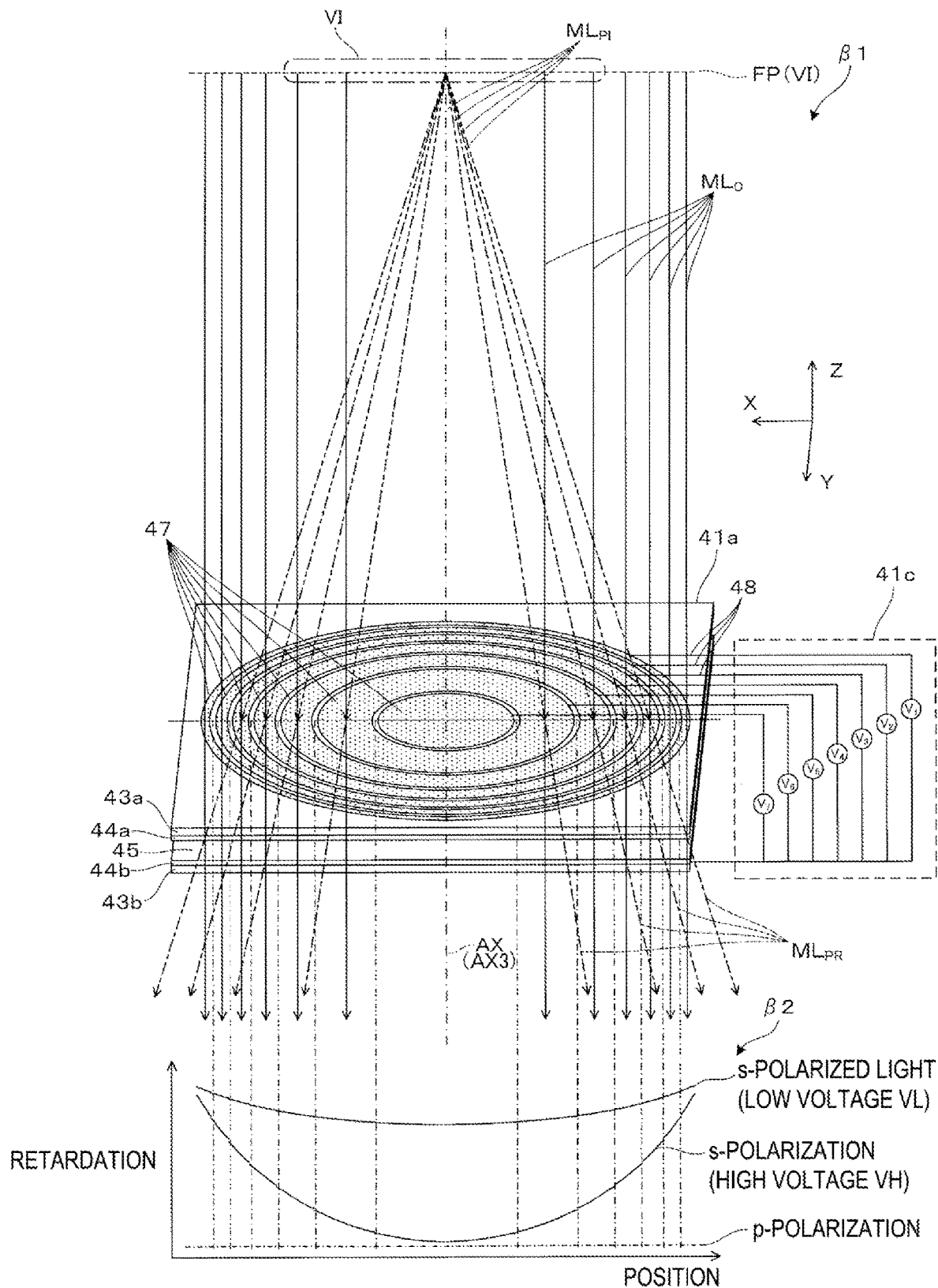
FIG. 6 is a diagram illustrating another operation of the liquid crystal lens.

FIG. 6 is a diagram illustrating a case where the liquid crystal lens 41 is operated as a concave lens. In FIG. 6, an upper side β1 is a conceptual perspective view of the liquid crystal lens 41, and a lower side 32 is a chart illustrating a distribution state of retardation of the liquid crystal lens 41. When the liquid crystal lens 41 has an effect of a concave lens, the application voltage V7 is set to be higher than the application voltage V1, and the application voltages V2 to V6 are set to values gradually changed within a voltage range of V1 to V7. In this case, for s-polarized light, a voltage applied to the electrode 47 disposed on the innermost side, which is a central portion, is increased, retardation is reduced, and a large phase difference is given, so that a wavefront advances. A voltage applied to the electrode 47 disposed on the outermost side, which is a peripheral portion, is lowered, retardation is maintained in a state close to the original state, and a large phase difference is not given, so that a wavefront does not advance. Thus, image light $ML_0$ in a collimated state is s-polarized light, and passes through the liquid crystal lens 41 to receive an action as a concave lens and becomes image light $ML_{PR}$ in a diverging state. Virtual image light $ML_{PI}$ that traces back the image light $ML_{PR}$ is regarded as diverging from a predetermined focal plane FP, and forms a virtual image VI on the predetermined focal plane FP. When the application voltages V1 to V7 applied to the large number of electrodes 47 are set to zero, the collimated image light $ML_0$ travels straight through the liquid crystal lens 41 and remains as parallel beams. In the above, when a relative ratio of the application voltages V1 to V7 is substantially maintained so that the application voltages are set to be low, a difference in retardation between the center and the periphery decreases, and an absolute value of negative power of the liquid crystal lens 41 decreases. That is, the negative power of the liquid crystal lens 41 can be adjusted.

The outside light OL is p-polarized light, and even when the outside light OL passes through the liquid crystal lens 41, retardation is maintained uniform in the XY plane regardless of the values of the application voltages V1 to V7. Thus, a phase difference is not imparted, and the outside light OL is not affected by a lens action of the liquid crystal lens 41.

The number of electrodes 47 constituting the first electrode layer 44a is not limited to the above, and can be set variously in consideration of accuracy and the like required for the liquid crystal lens 41.

Although an electrode pattern illustrated in area AR1 of FIG. 5 has a plurality of circular orbicular zone portions disposed concentrically, a plurality of oval orbicular zone portions or elliptical orbicular zone portions may be arranged concentrically as illustrated in area AR2 of FIG. 5. In this case, it is possible to adjust a focus while allowing individual differences in interpupillary distance.

In the above description, the liquid crystal lens 41 has been described as one in which retardation gradually decreases or increases from the center to the periphery, but the liquid crystal lens 41 can also be a Fresnel lens as disclosed, for example, in International Publication WO2009/072670.

In describing the optical path, the image light ML from the first display element 11a is incident on the projection lens 21 and is emitted from the projection lens 21 in a substantially collimated state. The image light ML that has passed through the projection lens 21 is incident on the prism mirror 22, passes through the incident surface 22a while being refracted, is reflected by the reflection surface 22b with a high reflectance close to 100%, and is refracted again by the emitting surface 22c. The image light ML from the prism mirror 22 passes through the polarizing plate 23 and becomes only s-polarized light, and the image light ML once forms an intermediate image IM and is then incident on the see-through mirror 24. The image light ML incident on the see-through mirror 24 is partially reflected by the reflection surface 24c. The image light ML reflected by the see-through mirror 24 passes through the liquid crystal lens 41 and is incident on the eye EY of the wearer US or the pupil position PP where the pupil is disposed. Outside light OL of p-polarized light having passed through the see-through mirror 24 is also incident on the pupil position PP. In other words, the wearer US wearing the first display device 100A can observe a virtual image of the image light ML in a state where it is superimposed on an external image. The image light ML incident on the pupil position PP is basically divergent light from a predetermined focal plane FP set at a finite distance or collimated light corresponding to infinity, but the image light ML can be equivalent to diverging light from any focal plane that is closer than infinity by controlling the liquid crystal lens 41. On the other hand, since the outside light OL is not affected by the liquid crystal lens 41, it is possible to observe a natural external image.

In the above description, when the image light ML is divergent light from a predetermined focal plane FP set at a finite distance, the focal plane FP is set, for example, 0.5 m to 2.5 m ahead.

Figure 7:
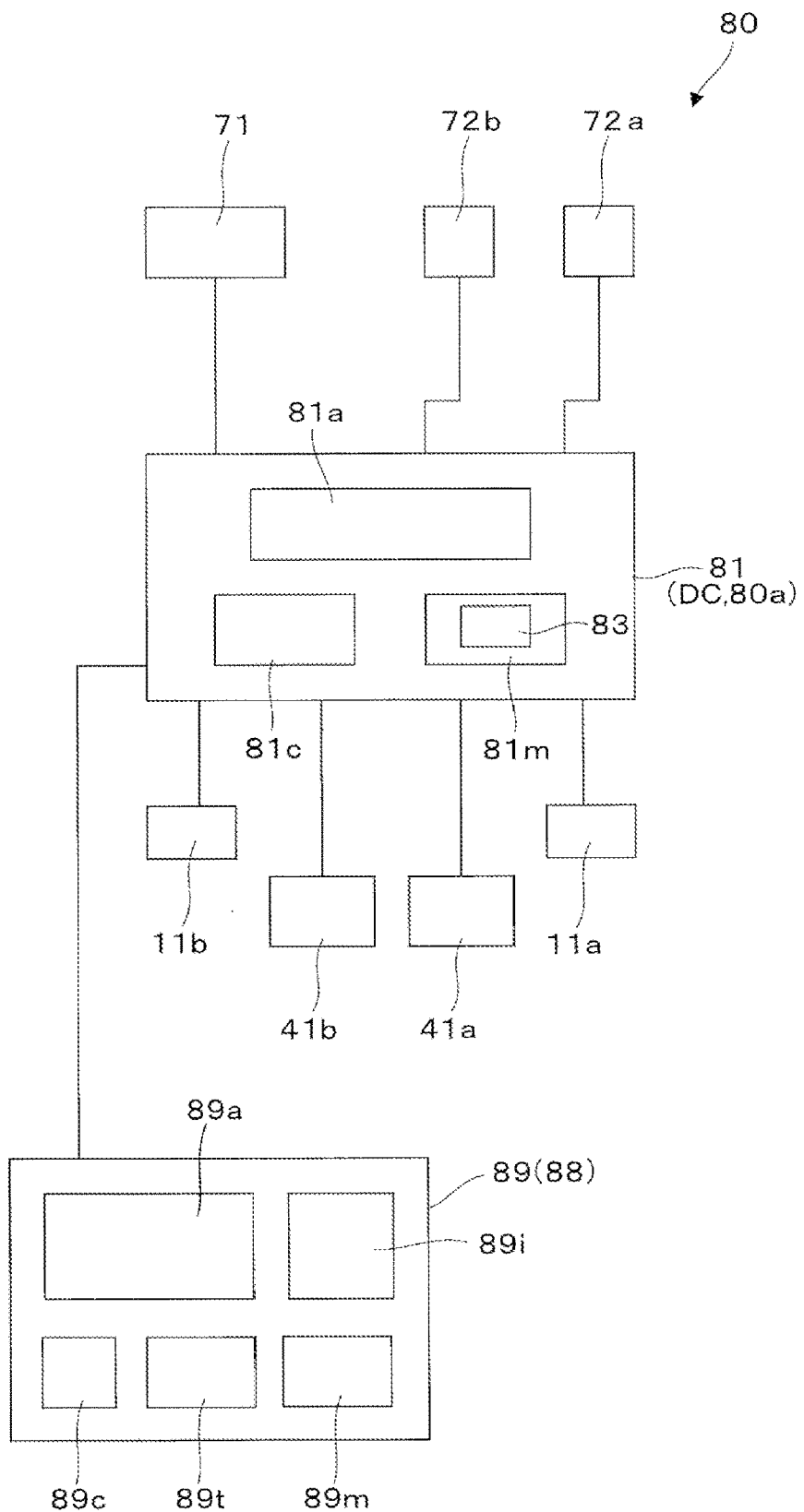

A circuit system 80 of the HMD 200, that is, the virtual image display device 100 will be described with reference to FIG. 7. The HMD 200 includes, as a circuit system 80, a control device 81, a pair of display elements 11a and 11b, a distance measurement unit 71, line-of-sight detection units 72a and 72b, and a user terminal circuit 89. The control device 81 functions as an image display control unit DC. A circuit member 80a incorporated in the first display device 100A illustrated in FIG. 3 and a similar circuit member (not illustrated) incorporated in the second display device 100B are parts of the circuit system 80.

The control device 81 includes an arithmetic processing device 81a, a storage device 81m, and a data communication interface 81c.

The arithmetic processing device 81a determines a distance to an object gazed at by an observer (that is, a target distance) based on signals output from the distance measurement unit 71 and the line-of-sight detection units 72a and 72b, and determines an image shift amount that matches a convergence angle corresponding to the target distance. This image shift amount is referred to as a convergence adjustment shift amount.

The storage device 81m stores a program for causing the first display device 100A and the second display device 100B to perform a display operation. The storage device 81m stores images acquired from a user terminal 88, which is an information terminal, images generated by the arithmetic processing device 81a, and the like. The storage device 81m includes a frame memory 83, and the frame memory 83 stores image data generated by the arithmetic processing device 81a and output to the display elements 11a and 11b. In the storage device 81m, a convergence adjustment shift amount determined based on the outputs of the distance measurement unit 71 and the line-of-sight detection units 72a and 72b is also recorded while being updated in real time.

The control device 81 receives display data corresponding to image data from user terminal circuit 89 via the data communication interface 81c. The arithmetic processing device 81a performs correction processing for shifting a display image on the display surface 11d to the right and left based on the convergence adjustment shift amount for the display data or image data acquired from the user terminal circuit 89. The control device 81 outputs the image data, which is the processed display data stored in the frame memory 83, to the display elements 11a and 11b via the data communication interface 81c.

The user terminal circuit 89 is incorporated in the user terminal 88 and includes a main control device 89a, a storage device 89m, a data communication interface 98c, a mobile object wireless communication device 89t, and a user interface device 89i. The user terminal circuit 89 can communicate with various devices such as an external server via a communication network, which is not illustrated in the drawing, by the mobile object wireless communication device 89t. The storage device 89m stores a basic program for operating the user terminal circuit 89, and stores a plurality of pieces of application software including, for example, a viewer and a web browser for reproducing moving images as application software that operates on this basic program. The user terminal circuit 89 operates in response to a request received from the user interface device 89i operated by a user, and outputs moving images and still images stored in the storage device 89m in association with application software to the control device 81 in a predetermined format. Alternatively, the user terminal circuit 89 acquires moving images and still images corresponding to various contents via the mobile object wireless communication device 89t, and outputs the acquired display data to the control device 81 in a predetermined format.

The user terminal circuit 89 receives various operations of the wearer US. For example, the main control device 89a receives an instruction from the wearer US via the user interface device 89i. Specifically, when the wearer US feels uncomfortable with a focal position or a convergence angle of a displayed image, or when the wearer US desires to positively adjust the focal position or the convergence angle, the wearer US can input settings for the focal position and the convergence angle via the user interface device 89i, and the main control device 89a outputs the setting values of the focal position and the convergence angle to the control device 81 via the data communication interface 81c. The control device 81 operates the display elements 11a and 11b based on the setting value of the convergence angle which is designated by the user terminal circuit 89, and causes the display elements 11a and 11b to perform operations corresponding to the set convergence angle. Further, the control device 81 operates the liquid crystal lens 41 based on the setting value of the focal position which is designated by the user terminal circuit 89, and adjusts the power of the liquid crystal lens 41 so that a virtual image is formed at the set focal position. In this case, the user terminal circuit 89 is operated by the wearer and functions as an operation device for adjusting at least one of a convergence angle and a focal length of a displayed image.

Figure 8:
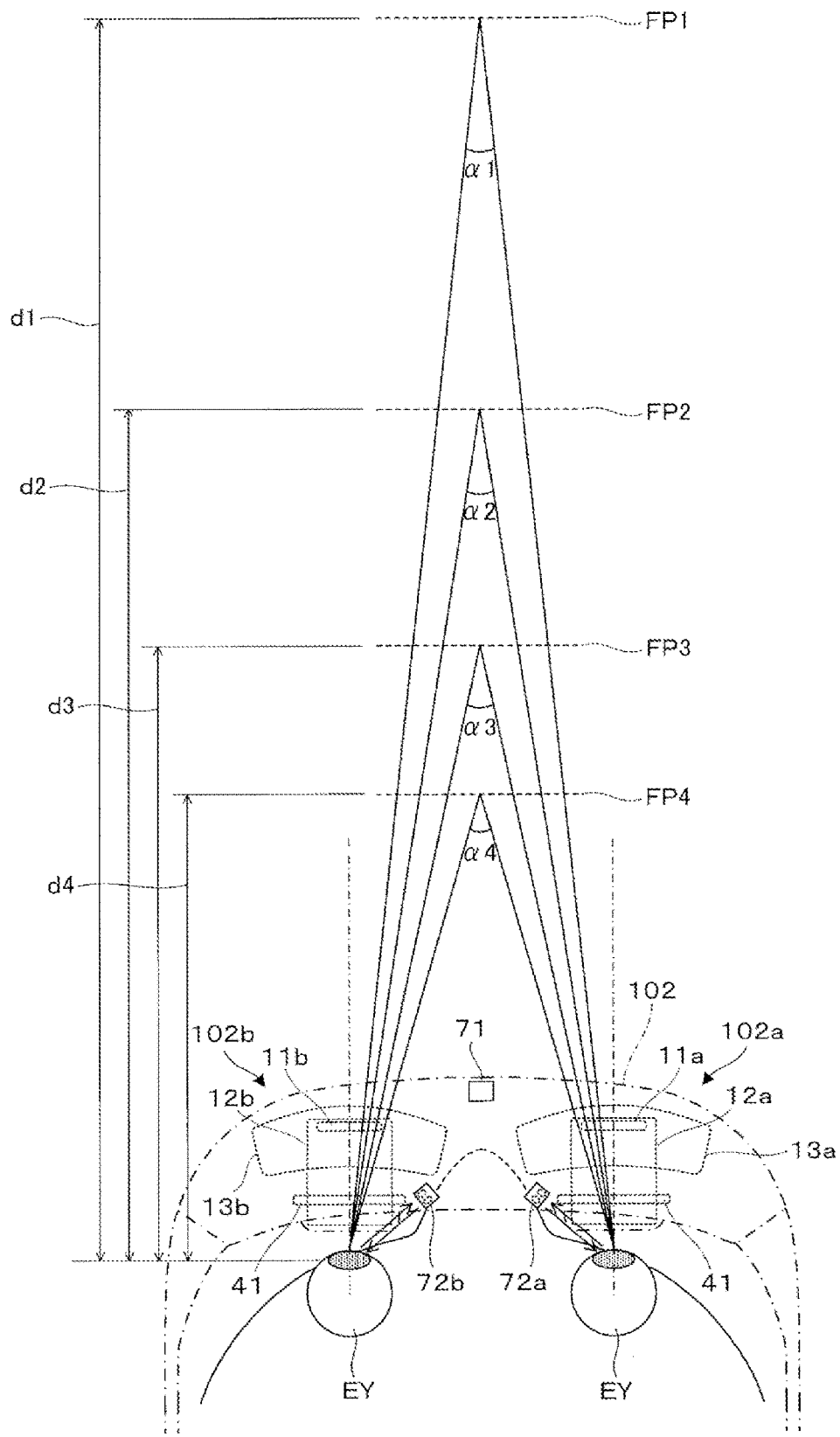
FIG. 8 is a diagram illustrating a relationship between a convergence angle controlled by a control device and a focal plane.

FIG. 8 is a conceptual diagram illustrating a relationship between a convergence angle and a focal plane controlled by the control device 81 (see FIG. 7) of the virtual image display device 100. The control device 81 calculates the corresponding convergence angles $\alpha 1$ to $\alpha 4$ and the corresponding convergence adjustment shift amounts from the target distances d1 to d4 calculated based on the output signals of the distance measurement unit 71 and the line-of-sight detection units 72a and 72b. The control device 81 performs correction processing on display data or image data to shift a display image by the convergence adjustment shift amounts corresponding to the convergence angles $\alpha 1$ to $\alpha 4$. Here, the convergence adjustment shift amounts set for both the display elements 11a and 11b are nose-side shift amounts having magnitudes corresponding to the half values of the convergence angles $\alpha 1$ to $\alpha 4$. When the correction processing for shifting the display image is performed, the control device 81 outputs a control signal to the drive circuit 41c of the liquid crystal lens 41 to correct the power of the liquid crystal lens 41 so that focal planes FP1 to FP4 are disposed at the target distances d1 to d4 given the convergence adjustment shift amounts or the convergence angles $\alpha 1$ to $\alpha 4$. Thereby, for both eyes EY of the wearer US, a display image formed at the display elements 11a and 11b at a convergence angle corresponding to a target distance is observed by the virtual image display device 100, the display image being a virtual image on a focal plane matching the target distance to an object gazed at.

Figure 9:
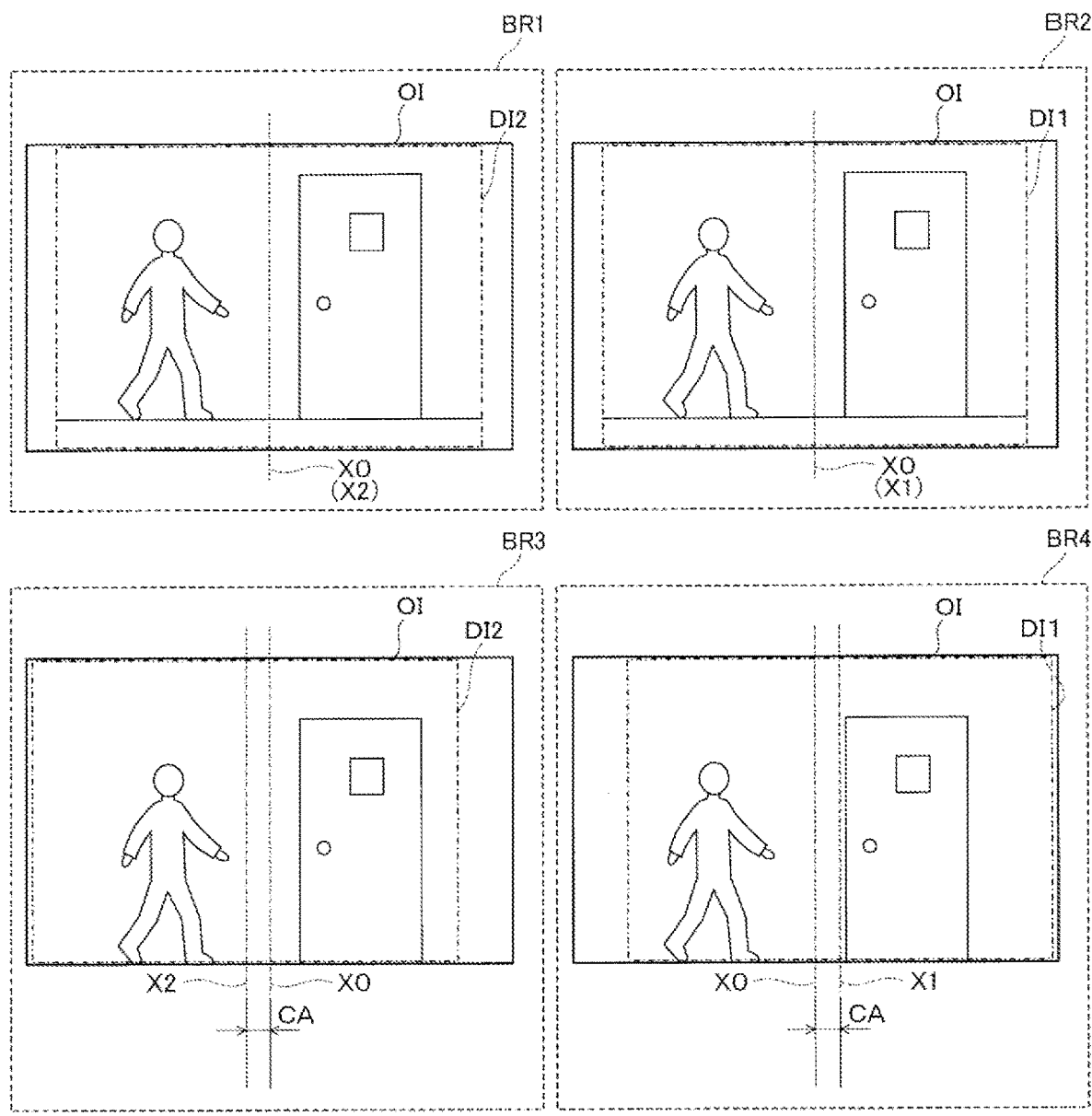
FIG. 9 is a diagram illustrating a change in a display image caused by a change in convergence.

FIG. 9 is a diagram illustrating images displayed on the display elements 11a and 11b. In FIG. 9, an area BR2 indicates a display image DI1 formed at the right first display element 11a at a certain timing, and an area BR1 indicates a display image DI2 formed at the left second display element 11b at the same timing. The display images DI1 and DI2 are parts of an original image OI, and central axes X1 and X2 of the display images DI1 and DI2 match a central axis X0 of the original image OI. In this case, the target distance is infinite, and a convergence angle is zero. Thus, convergence adjustment shift amounts in the display image formed at the first display element 11a and the display image formed at the second display element 11b are zero. In FIG. 9, an area BR3 indicates a display image formed at the right first display element 11*a* at another timing, and an area BR4 indicates a display image formed at the left second display element 11*b* at the other timing. In this case, the target distance is a relatively short finite distance, and the convergence angle is several degrees or more. For this reason, convergence adjustment shift amounts CA in the display image DI1 formed at the first display element 11*a* and the display image DI2 formed at the second display element 11*b* are considerably large. The area of the display image DI1 for the right eye is selected in a direction away from the nose, and the area of the display image DI2 for the left eye is selected in a direction away from the nose. Thus, an image with no misalignment can be observed for both eyes by tilting the right eye toward the nose by a half angle of the convergence angle and tilting the left eye toward the nose by a half angle of the convergence angle.

Figure 10:
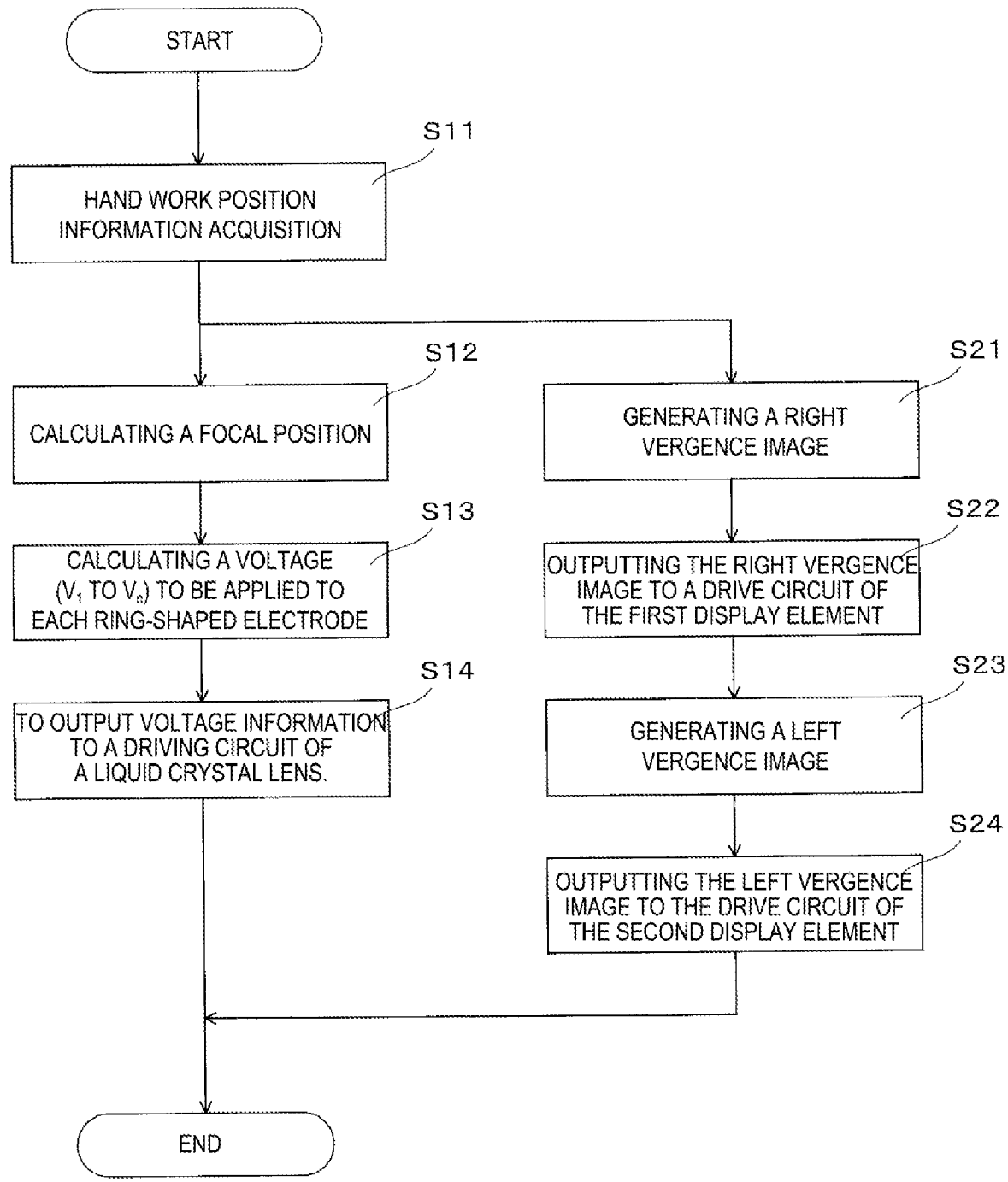
FIG. 10 is a flowchart illustrating operations of the virtual image display device.

FIG. 10 is a flowchart conceptually illustrating the operation of the control device 81. The arithmetic processing device 81*a* of the control device 81 calculates a target distance based on output signals of the distance measurement unit 71 and the line-of-sight detection units 72*a* and 72*b*, and stores the target distance in the storage device 81*m*, for example, as hand work position information (step S11). Next, the arithmetic processing device 81*a* calculates a focal position, which is the position of a focal plane, from the target distance stored in the storage device 81*m* (step S12). The focal position does not need to match the target distance exactly, but may be an approximate position. Next, the arithmetic processing device 81*a* calculates application voltages V1 to V7 to be applied to the electrodes 47 so as to adjust the power of the liquid crystal lens 41 to form a virtual image at the focal position (step S13). Thereafter, the arithmetic processing device 81*a* outputs voltage information including the application voltages V1 to V7 to the drive circuit 41*c* of the liquid crystal lens 41 as a control signal (step S14). In parallel with the above, the arithmetic processing device 81*a* generates a right convergence image by correction processing for calculating a convergence adjustment shift amount CA for the right eye from the target distance obtained in step S11 and giving a shift corresponding to the convergence adjustment shift amount CA to the original image OI (step S21). Next, the arithmetic processing device 81*a* outputs the right convergence image obtained in step S21 to the drive circuit of the first display element 11*a* (step S22). The arithmetic processing device 81*a* generates a left convergence image by correction processing for calculating a convergence adjustment shift amount CA for the left eye from the target distance obtained in step S11 and giving a shift corresponding to the convergence adjustment shift amount CA to the original image OI (step S23). Next, the arithmetic processing device 81*a* outputs the left convergence image obtained in step S23 to the drive circuit of the second display element 11*b* (step S24). When the right convergence image displayed by the first display element 11*a* is observed with the right eye, the left convergence image displayed by the second display element 11*b* is observed with the left eye, and both the images are superimposed on each other, both eyes are oriented in the line-of-sight direction in which a convergence angle corresponding to the target distance is realized. That is, a focus state and a convergence state of both eyes EY match, and asthenopia is less likely to occur.

In the above operation, a focus position and a convergence adjustment shift amount are adjusted in accordance with a target distance to an object to be gazed at, but a focus position and a convergence adjustment shift amount may be adjusted in accordance with a target distance only in the case of a hand work position where a target distance to an object to be gazed at is a predetermined value or less. For example, 1 m or less can be set as the hand work position. In this case, a focus state and a convergence state of both eyes EY can be matched at a distance for reading books and data (0.3 m) and a distance for viewing a display (0.5 m to 0.7 m), and an image displayed by the virtual image display device 100 can be observed without a sense of incompatibility.

In the above description, a target distance to an object gazed at by an observer is determined based on a line-of-sight detection result, but line-of-sight detection is not essential. For example, a priority object can be specified by determining a target distance by specifying the degree to which an object image present in the front direction of the virtual image display device 100 is present at a position close to a center within an angle of view, and a ratio of the object image present in the front direction of the virtual image display device 100 to the angle of view, and a target distance can be determined.

Figure 11:
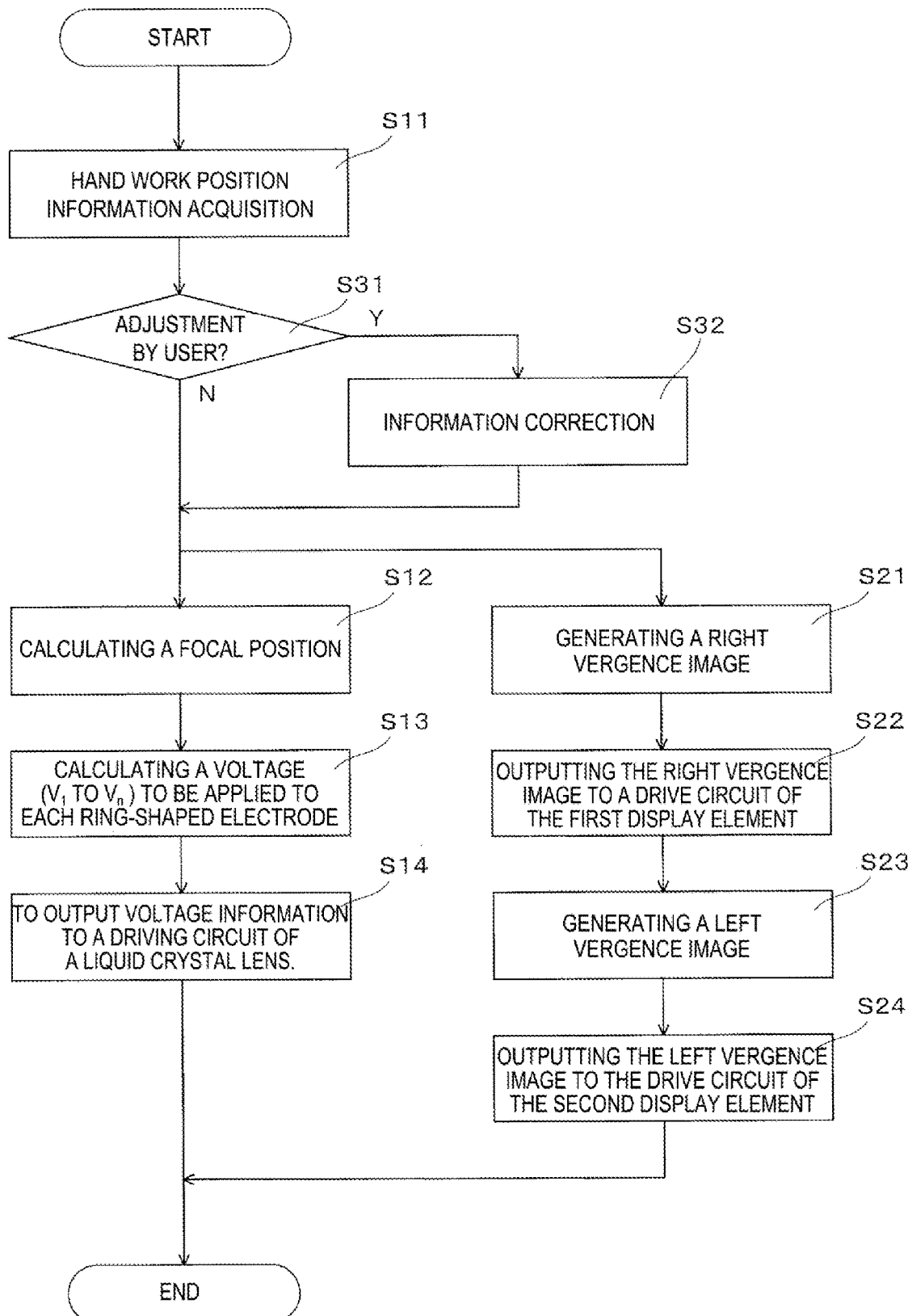
FIG. 11 is a flowchart illustrating operations in a modification example.

FIG. 11 is a diagram illustrating operations in a modification example. In this case, the user who is the wearer US is allowed to adjust a focal position and a convergence angle by himself or herself. When the wearer US operates the user terminal circuit 89 to make a request for adjusting the focal position (step S31), the arithmetic processing device 81*a* performs correction for rewriting a measured target distance to a target distance designated by the user terminal circuit (operation device) 89 (step S32). The designation from the user terminal circuit 89 may be the target distance itself, or may correspond to an addition value or a subtraction value of a distance.

The virtual image display device 100 according to the first embodiment described above includes the first image display device 2*a* that displays a virtual image, the second image display device 2*b* that displays a virtual image, the line-of-sight direction distance detection device 70*a* that detects an object distance in the line-of-sight direction of the wearer US, the image display control unit DC that controls display states of the first image display device 2*a* and the second image display device 2*b* in accordance with the object distance, and the focal length changing device 40 including the liquid crystal lens 41 that is disposed in front of the eyes of the wearer US and functions with respect to an s-polarization component of image light ML emitted from the first image display device 2*a* and the second image display device 2*b*.

In the virtual image display device, the first image display device 2*a* and the second image display device 2*b* include the focal length changing device 40 including the liquid crystal lens 41 disposed in front of the eyes of the wearer US and functioning with respect to an s-polarization component of image light ML emitted from each of the image display devices. Thus, it is possible to rapidly perform focus adjustment on the s-polarization component of the image light ML by the liquid crystal lens 41 and to rapidly perform convergence adjustment by operating the image display devices 2*a* and 2*b* under the control of the image display control unit DC. Since the liquid crystal lens 41 is disposed in front of the eyes of the wearer US on an optical path where a light beam flux is relatively thick, it becomes easy to suppress the disturbance of surface accuracy.

Second Embodiment

Hereinafter, a virtual image display device according to a second embodiment will be described. The virtual image display device according to the second embodiment is obtained by partially modifying the virtual image display device according to the first embodiment, and description of parts in common with those of the virtual image display device according to the first embodiment will be omitted.

Figure 12:
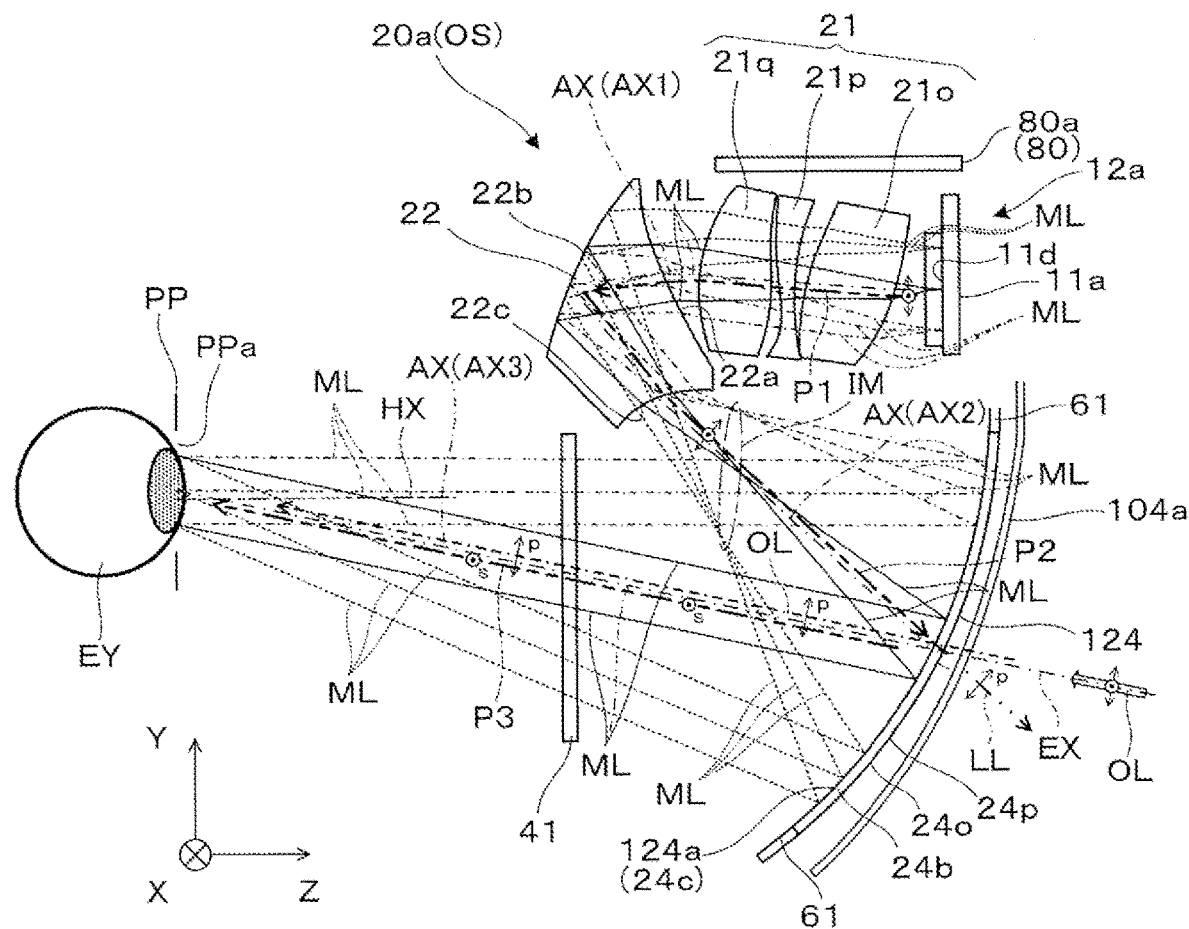
FIG. 12 is a diagram illustrating a virtual image display device according to a second embodiment.

Referring to FIG. 12, in a virtual image display device 100 or an HMD 200 in the second embodiment, the polarizing plate 23 illustrated in FIG. 3 for describing the first embodiment is omitted. A see-through mirror 124 is an optical element in which a polarizing reflection film 124a is formed at the rear surface of a plate-shaped body 24b as a reflection surface 24c. The polarizing reflection film 124a is constituted by, for example, a dielectric multilayer film. The see-through mirror 124 functions as a reflective polarizing plate. The see-through mirror 124 or the reflection surface 24c is a polarization beam splitter that reflects image light ML, which is s-polarized light incident from the inside, with a high reflectance. The reflection surface 24c transmits a p-polarization component in outside light OL incident from the outside with a high transmittance, and substantially blocks an s-polarization component by reflection. In this case, in an optical path portion P2 on a light emission side of a prism mirror 22, the image light ML includes s-polarized light and p-polarized light. In the image light ML incident on the see-through mirror 124, s-polarized light is reflected by the reflection surface 24c and passes through a liquid crystal lens 41 to form a virtual image. In the image light ML incident on the see-through mirror 124, p-polarized light passes through the reflection surface 24c, does not reach eyes EY, and does not contribute to the formation of the virtual image. The polarizing reflection film 124a of the see-through mirror 24 transmits the p-polarized light in the outside light OL. The outside light OL passes through the liquid crystal lens 41 as p-polarized light and is not affected by a lens action of the liquid crystal lens 41.

Third Embodiment

Hereinafter, a virtual image display device according to a third embodiment will be described. The virtual image display device according to the third embodiment is obtained by partially modifying the virtual image display device according to the first embodiment, and description of parts in common with those of the virtual image display device according to the first embodiment will be omitted.

Figure 13:
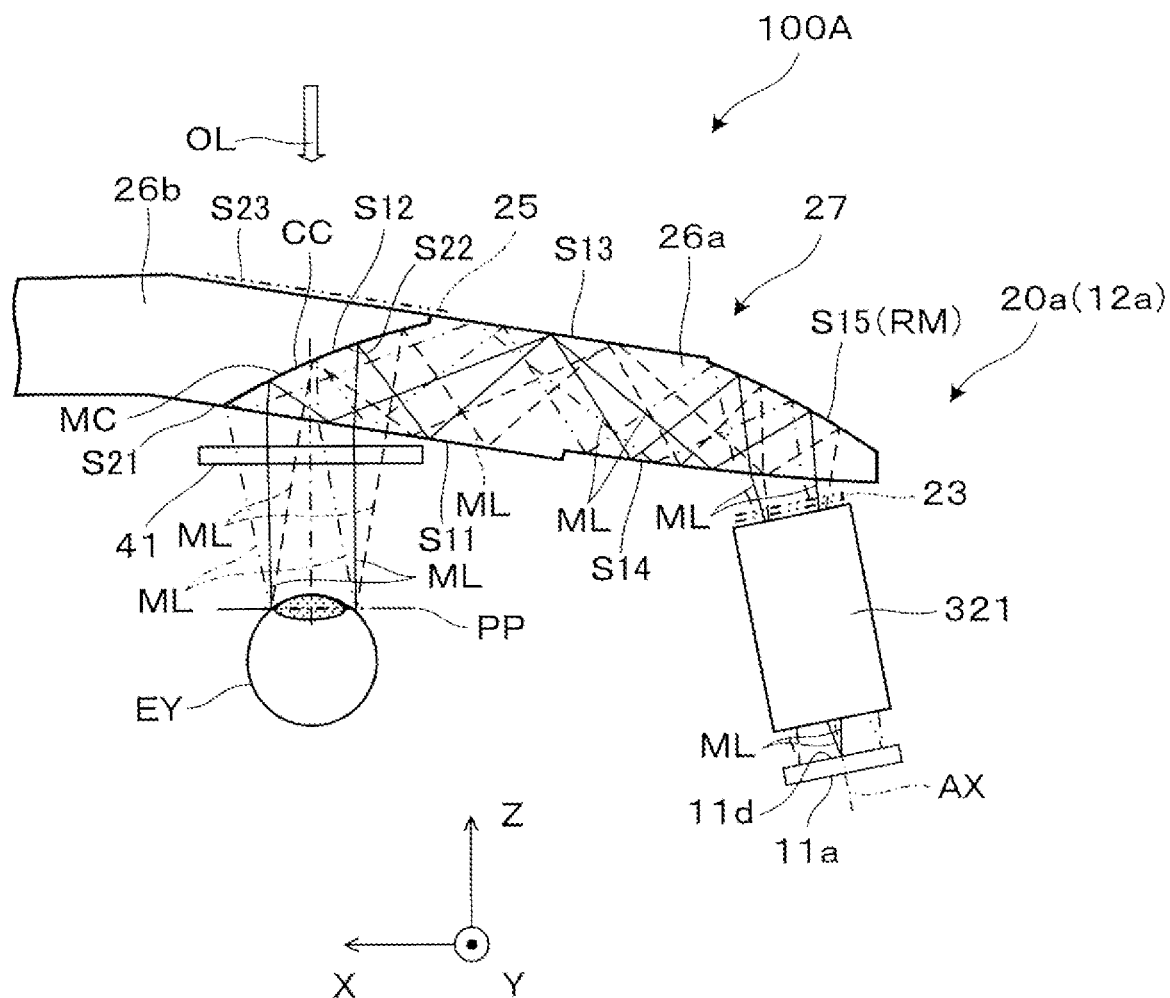
FIG. 13 is a diagram illustrating a virtual image display device according to a third embodiment.

FIG. 13 is a plan view illustrating a first display unit 20a incorporated in a virtual image display device 100 or an HMD 200 according to the third embodiment. In this case, a projection lens 321 and a light guide 26 are used instead of the projection lens 21, the prism mirror 22, the polarizing plate 28, and the see-through mirror 24 illustrated in FIG. 3. The light guide 26 is formed by joining a light guide member 26a and a light transmitting member 26b via an adhesive layer CC. The light guide member 26a and the light transmitting member 26b are formed of a resin material that exhibits high light transmittance in a visible range. The light guide member 26a has first to fifth surfaces S11 to S15, of which the first and third surfaces S11 and S13 are planes parallel to each other, and the second, fourth and fifth surfaces S12, S14, and S15 are convex optical surfaces as a whole and are constituted by, for example, free-form surfaces. The light transmitting member 26b has first to third transmitting surfaces S21 to S23, of which the first and third transmitting surfaces S21 and S23 are planes parallel to each other, and the second transmitting surface S22 is a concave optical surface as a whole and is constituted by, for example, a free-form surface. The second surface S12 of the light guide member 26a and the second transmitting surface S22 of the light transmitting member 26b have the same shape in which irregularities are reversed, and a partially reflecting surface MC is formed at one surface of both. The partially reflecting surface MC is a polarizing reflection film, and reflects image light ML, which is s-polarized light incident from the inside, with a high reflectance. The reflection surface 24c transmits a p-polarization component in outside light OL incident from the outside with a high transmittance.

When the partially reflecting surface MC has no difference in reflection characteristics with respect to polarized light, such as a half mirror, a polarizing plate 23 that transmits s-polarized light is disposed between the projection lens 321 and the light guide 26, and the polarizing film 25, which is a p-polarized light transmitting film, is disposed on the third transmitting surface S23. In this case, the possibility of the image light ML, which is s-polarized light, leaking out is reduced, and privacy is enhanced.

Fourth Embodiment

Hereinafter, a virtual image display device according to a fourth embodiment will be described. The virtual image display device according to the fourth embodiment is obtained by partially modifying the virtual image display device according to the first embodiment, and description of parts in common with those of the virtual image display device according to the first embodiment will be omitted.

Figure 14:
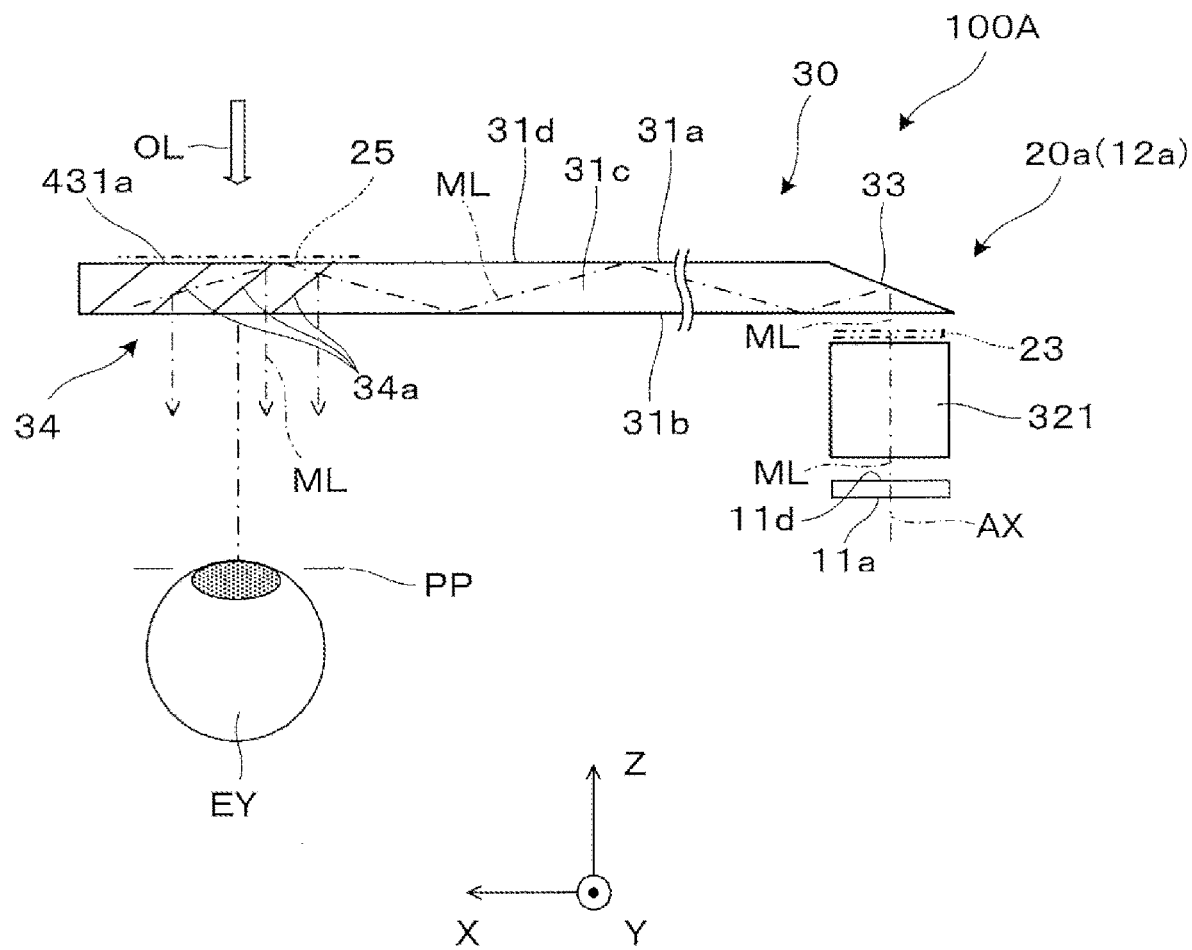
FIG. 14 is a diagram illustrating a virtual image display device according to a fourth embodiment.

FIG. 14 is a plan view illustrating a first display unit 20a incorporated in a virtual image display device 100 or an HMD 200 according to the fourth embodiment. In this case, a projection lens 321 and a light guide optical system 30 are used instead of the projection lens 21, the prism mirror 22, the polarizing plate 28, and the see-through mirror 24 illustrated in FIG. 3. The light guide optical system 30 is a plate-shaped member including an outer plane 31a on the outside world side and an inner plane 31b on a pupil position PP side. The outer plane 31a and the inner plane 31b extend parallel to each other, and a body 31c between the outer plane 31a and the inner plane 31b is a uniform refracting medium that is transparent in a visible light range. A plane mirror 33 is provided at an end of the light guide optical system 30 on an incidence side facing the projection lens 321, and a half mirror array 34 is embedded at an end of the light guide optical system 30 on an emission side. The half mirror array 34 is obtained by arranging a large number of half mirrors 34a in a light guide direction. The half mirror 34a is a polarizing mirror of which the reflectance is adjusted to partially reflect S-polarized light. In this case, image light ML emitted from the projection lens 321 is collimated through the projection lens 21, is incident on a light guide member 31d at one end of the light guide member 31d, is reflected by the plane mirror 33, travels through the body 31c, and is incident on the half mirror array 34. The half mirror array 34 serves as a polarizing mirror to branch and reflect the image light ML which is s-polarized light, thereby enlarging the pupil size in the horizontal direction and causing the collimated image light ML, which is s-polarized light, to be emitted to the outside of the light guide optical system 30.

When the half mirror array 34 has no difference in reflection characteristics with respect to polarization, a polarizing plate 23 that transmits s-polarized light is disposed between the projection lens 321 and the light guide optical system 30, and a polarizing film 25, which is a p-polarized light transmitting film, is formed at an outer surface 431*a* of the half mirror array 34.

Modification Examples and Others

Although the present disclosure has been described with reference to the above-described embodiments, the present disclosure is not limited to the above-described embodiments and can be implemented in various modes without departing from the spirit of the disclosure. For example, the following modifications are possible.

In the above-described embodiments, the optical elements constituting the display units 20*a* and 20*b* or the image display devices 2*a* and 2*b* are merely examples, and the number of lenses, the number of mirrors, the bending direction of the optical path, and the like can be appropriately changed depending on purpose.

The see-through mirror 24 and the half mirror array 34 can be replaced with those that change an optical path using a hologram or a diffraction element.

The display elements 11*a* and 11*b* can be replaced with light-modulating or self-luminous display panels that generate image light polarized in a specific direction. The display elements 11*a* and 11*b* may form a color image by synthesizing three-color image light with a cross dichroic prism.

In the above description, for example, the image light ML, which is s-polarized light, is reflected by the see-through mirror 124, but image light ML, which is p-polarized light, can also be reflected and pass through the liquid crystal lens 41. In this case, the liquid crystal lens 41 changes its orientation, for example, so that it functions as a lens for p-polarized light and functions as a parallel plate for s-polarized light.

Although not described above, an inner lens for diopter adjustment can be disposed between the liquid crystal lens 41 and the pupil position PP. The inner lens can be integrated with the liquid crystal lens 41. Alternatively, the liquid crystal lens 41 itself may be equipped with a diopter adjustment function for correcting myopia of the wearer US.

Although it has been assumed above that the HMD 200 is worn on the head and is used, the virtual image display device 100 may also be used as a handheld display that is not worn on the head and is to be looked into like binoculars. In other words, the head-mounted display also includes a hand-held display in the present disclosure.

A virtual image display device in a specific aspect includes a first image display device configured to display a virtual image, a second image display device configured to display a virtual image, a line-of-sight direction distance detection device configured to detect an object distance in a line-of-sight direction of a wearer, an image display control unit configured to control display states of the first image display device and the second image display device in accordance with the object distance, and a liquid crystal lens configured to be disposed in front of eyes of the wearer and configured having a focal length changing with respect to a polarization component of image light emitted from the first image display device and the second image display device.

In the virtual image display device, the first image display device and the second image display device are disposed in front of the eyes of the wearer, and the virtual image display device includes the liquid crystal display device in which a focal length changes with respect to the polarization component of the image light emitted from the image display devices. Thus, it is possible to rapidly perform focus adjustment on the polarization component of the image light by the liquid crystal lens and to rapidly perform convergence adjustment by operating the image display devices under the control of the image display control unit. Since the liquid crystal lens is disposed in front of the eyes of the wearer on an optical path where the a light beam flux is relatively thick, it becomes easy to suppress disturbance of a wavefront.

In the virtual image display device according to the specific embodiment, the liquid crystal lens has different application voltages in a central portion and a peripheral portion, and changes a lens effect by changing a distribution state of birefringence. In this case, it is possible to easily improve the accuracy of adjustment of power of the liquid crystal lens.

In the virtual image display device according to the specific aspect, the liquid crystal lens has a plurality of circular or elliptical orbicular zone portions to which the application voltage is common.

In the virtual image display device according to the specific aspect, the image display control unit adjusts a convergence angle of a display image displayed by the first image display device and the second image display device in accordance with the object distance.

In the virtual image display device according to the specific aspect, the image display control unit adjusts power of the liquid crystal lens in accordance with the object distance. For example, when the adjustment of the convergence angle and the adjustment of the power are associated with each other, the adjustment of the convergence angle and the adjustment of the focus are matched to make a distance and a focal length corresponding to the convergence angle substantially coincident with each other, whereby it is possible to reduce the burden on the eyes of the wearer.

The virtual image display device according to the specific aspect further includes an operation device configured to adjust at least one of the convergence angle of the display image and power of the liquid crystal lens. In this case, the wearer can operate the operation device to adjust the convergence angle and the focus to a desired state.

In the virtual image display device according to the specific aspect, the first image display device and the second image display device each include a display element, a projection optical system, and a combiner, and the liquid crystal lens transmits, without a lens effect, outside light that passed the combiner. In this case, it is possible to synthesize outside light and image light using a thin combiner.

In the virtual image display device according to the specific embodiment, the combiner includes a polarizing beam splitter and transmits outside light which is p-polarized light, and the liquid crystal lens gives a phase difference to the image light which is s-polarized light to adjust an imaging state, and does not give a phase difference to the p-polarized light. In this case, the polarizing beam splitter can efficiently reflect the image light while transmitting the outside light, and the liquid crystal lens can rapidly and precisely adjust the imaging state of the image light which is s-polarized light.

What is claimed is:

1. A virtual image display device, comprising:
   a first image display device configured to display a virtual image;
   a second image display device configured to display a virtual image;
   a line-of-sight direction distance detection device configured to detect an object distance in a line-of-sight direction of a wearer;

an image display control unit configured to control display states of the first image display device and the second image display device in accordance with the object distance; and a liquid crystal lens configured to be disposed in front of eyes of the wearer and configured to have a focal length changing with respect to a polarization component of image light emitted from the first image display device and the second image display device, wherein the first image display device and the second image display device each include a display element, a projection optical system, and a combiner, and the liquid crystal lens transmits, without a lens effect, outside light that passed the combiner, the combiner includes a polarizing beam splitter and transmits outside light that is p-polarized light, and the liquid crystal lens gives a phase difference to the image light that is s-polarized light to adjust an imaging state, and does not give a phase difference to the p-polarized light.

2. The virtual image display device according to claim 1, wherein the liquid crystal lens has different application voltages in a central portion and a peripheral portion, and changes a lens effect by changing a distribution state of birefringence.

3. The virtual image display device according to claim 2, wherein the liquid crystal lens has a plurality of circular or elliptical orbicular zone portions, and the application voltage in each of the plurality of circular or elliptical orbicular zone portions is common across an area of the each of the plurality of circular or elliptical orbicular zone portions.

4. The virtual image display device according to claim 1, wherein the image display control unit adjusts a convergence angle of a display image displayed by the first image display device and the second image display device in accordance with the object distance.

5. The virtual image display device according to claim 4, further comprising an operation device configured to adjust the convergence angle of the display image.

6. The virtual image display device according to claim 1, wherein the image display control unit adjusts power of the liquid crystal lens in accordance with the object distance.

7. The virtual image display device according to claim 6, further comprising an operation device configured to adjust power of the liquid crystal lens.

* * * * *